(12) United States Patent
Sugiyama et al.

(10) Patent No.: US 9,220,100 B2
(45) Date of Patent: Dec. 22, 2015

(54) COMMUNICATION SYSTEM AND TRANSMISSION UNIT

(75) Inventors: Takeshi Sugiyama, Hyogo (JP); Tadashi Matsumoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 171 days.

(21) Appl. No.: 13/877,535

(22) PCT Filed: Oct. 25, 2011

(86) PCT No.: PCT/JP2011/074589
§ 371 (c)(1),
(2), (4) Date: Apr. 3, 2013

(87) PCT Pub. No.: WO2012/057167
PCT Pub. Date: May 3, 2012

(65) Prior Publication Data
US 2013/0201976 A1    Aug. 8, 2013

(30) Foreign Application Priority Data
Oct. 25, 2010   (JP) ................................. 2010-238394

(51) Int. Cl.
*H04J 3/22*      (2006.01)
*H04L 29/06*     (2006.01)
(Continued)

(52) U.S. Cl.
CPC ............ *H04W 72/0446* (2013.01); *H04B 3/50* (2013.01)

(58) Field of Classification Search
USPC ....................................................... 370/336
See application file for complete search history.

(56) References Cited

U.S. PATENT DOCUMENTS

| | | |
|---|---|---|
| 7,327,381 B2 | 2/2008 | Suzuki |
| 7,339,959 B2 | 3/2008 | Nio et al. |

(Continued)

FOREIGN PATENT DOCUMENTS

| | | | |
|---|---|---|---|
| CA | 2681995 A1 | * | 10/2008 |
| JP | 54-40303 B2 | | 12/1979 |

(Continued)

OTHER PUBLICATIONS

International Search Report for corresponding International Application No. PCT/JP2011/074589 mailed Jan. 10, 2012.

(Continued)

*Primary Examiner* — Edan Orgad
*Assistant Examiner* — Sithu Ko
(74) *Attorney, Agent, or Firm* — Renner, Otto, Boisselle & Sklar, LLP

(57) ABSTRACT

A signal transceiving section transmits a transmission signal to a transmission path, each frame in the transmission signal is divided into a plurality of periods in a time axis direction, and the plurality of periods includes superimposing period for superimposing a superimposed signal. A transmission unit includes a signal adjustment section for changing the proportion of the superimposing period in one frame of the transmission signal. The signal adjustment section adjusts the proportion of the superimposing period in accordance with a transmission state of the superimposed signal transmitted between second communication terminals. The signal adjustment section may adjust the proportion of the superimposing period so that the proportion of the superimposing period in one frame of the transmission signal increase with increasing the volume of transmission data transmitted between the second communication terminals through the superimposed signal.

8 Claims, 6 Drawing Sheets

(51) Int. Cl.
*H04W 72/04* (2009.01)
*H04B 3/50* (2006.01)

(56) References Cited

U.S. PATENT DOCUMENTS

| | | |
|---|---|---|
| 7,379,121 B2 | 5/2008 | Suzuki et al. |
| 7,843,514 B2 | 11/2010 | Suzuki et al. |
| 8,345,169 B2 | 1/2013 | Suzuki et al. |
| 2002/0171761 A1 | 11/2002 | Suzuki et al. |
| 2003/0032392 A1 | 2/2003 | Suzuki |
| 2003/0112828 A1 | 6/2003 | Nio et al. |
| 2008/0198265 A1 | 8/2008 | Suzuki et al. |
| 2010/0254407 A1* | 10/2010 | Tanaka et al. ............... 370/468 |
| 2011/0072485 A1 | 3/2011 | Suzuki et al. |
| 2012/0081613 A1 | 4/2012 | Suzuki et al. |

FOREIGN PATENT DOCUMENTS

| | | |
|---|---|---|
| JP | 54-040304 B2 | 12/1979 |
| JP | 57-037264 B2 | 8/1982 |
| JP | 2002-125207 A | 4/2002 |
| JP | 2002-171495 A | 6/2002 |
| JP | 2009-225328 A | 10/2009 |
| SK | 2002-199359 A | 7/2002 |
| WO | 2009/096421 A1 | 8/2009 |

OTHER PUBLICATIONS

PCT/ISA/237 for corresponding International Application No. PCT/JP2011/074589 dated Jan. 10, 2012.

* cited by examiner

COMMUNICATION SYSTEM AND TRANSMISSION UNIT

TECHNICAL FIELD

The invention relates to: a communication system in which a first communication terminal and a second communication terminal are connected to a transmission path, the first communication terminal communicating using a transmission signal that is repeatedly transmitted from a transmission unit to a transmission path, and the second communication terminal communicating using a superimposed signal that is superimposed on the transmission signal; and the transmission unit.

BACKGROUND ART

A communication system has become widely used in which a transmission unit (master) and a plurality of communication terminals (slaves) are connected to a transmission path, and in which respective communication terminals communicate with the transmission unit. As an example of this kind of communication system, it has been known a system in which a transmission unit periodically monitors states of communication terminals, and transmits, upon detecting a change in the state of one of the communication terminals, a signal to other communication terminals so as to respond to the change of the state (see Japanese Patent Publication No. 1180690, Japanese Patent Publication No. 1195362 and Japanese Patent Publication No. 1144477).

However, in the communication system of above described structure, communication speed thereof is relatively low, because the communication terminals always perform communication via the transmission unit and the transmission unit performs polling the communication terminal. Accordingly, this communication system is unsuitable for transmitting information with a relatively large data volume such as an analog quantity. Further, this communication system has a problem that reliability thereof is low, because whole system will halt at the time of a failure of the transmission unit etc.

In view of this problem, there has been proposed such a communication system designed as a mixture of: an existing communication system for performing communication between communication terminals via a transmission unit; and a communication system for performing communication directly between communication terminals in a peer-to-peer mode (P2P) (see Japanese patent application publication No. 2009-225328). In this communication system, a transmission path is shared by: first communication terminals which communicate with each other via the transmission unit (master); and second communication terminals which communicate directly with each other. Therefore, the second communication terminals can be easily added to the existing communication system. In this communication system, the first communication terminals perform communication using a transmission signal (first protocol signal) which is repeatedly transmitted from the transmission unit to the transmission path. The second communication terminals perform communication using a superimposed signal (second protocol signal) which is superimposed on the transmission signal.

Incidentally, the transmission signal is a signal in conformity with a time-division system, and each one frame in the transmission signal is divided into a plurality of time periods in a time axis direction, and a part of the time periods is assigned as superimposable period within which the superimposed signal is allowed to be superimposed (i.e. superimposing period adapted for superimposing the superimposed signal). In this communication system, the second communication terminal performs communication during the part of the time periods of the transmission signal which is assigned as the superimposable period (superimposing period), by use of the superimposed signal which is transmitted through the transmission path shared with the transmission signal.

In this structure, when the transmission data can not be transmitted within a single superimposable period due to large data volume, the second communication terminal divides the transmission data into a plurality of data, and transmits them sequentially for each superimposable period. In this case, the transmission data is transmitted over a plurality of superimposable periods. If the volume of the transmission data becomes large, the second communication terminal may not be able to transmit the transmission data with a single frame of the transmission signal. In this case, the second communication terminal may transmit the transmission data over a plurality of frames.

As described above, the second communication terminal can transmit the superimposed signal only in a part of time period of the transmission signal, and it is therefore restricted the volume of data which can be transmitted within a single frame of the transmission signal. Accordingly, it has been difficult to improve the speed of the communication between the second communication terminals.

DISCLOSURE OF INVENTION

The present invention is developed in view of above problem, and an objective of the present invention is to provide a communication system and a transmission unit which can improve a communication speed of a communication performed using an superimposed signal.

The communication system of the present invention includes: a transmission unit connected to a transmission path and configured to repeatedly transmit a transmission signal to the transmission path; a first communication terminal connected to the transmission path and configured to communicate using the transmission signal; and second communication terminals each connected to the transmission path and configured to communicate using a superimposed signal superimposed on the transmission signal, wherein the transmission signal is a signal in conformity with a time-division system, each one frame in the signal being divided into a plurality of periods in a time axis direction, the plurality of periods including superimposing period adapted for superimposing the superimposed signal, and wherein the transmission unit includes a signal adjustment section configured to adjust, within a permissible range set by the transmission unit, a proportion of the superimposing period in one frame of the transmission signal in accordance with a transmission state of the superimposed signal, and transmits, to the transmission path, the transmission signal of which the proportion of the superimposing period is adjusted by the signal adjustment section.

In this communication system, it is preferred that wherein the signal adjustment section is configured to extend the superimposing period into maximum within the permissible range when the second communication terminals perform communication using the superimposed signal.

In this communication system, it is preferred that wherein the signal adjustment section is configured to shorten a period other than the superimposing period into minimum within the permissible range when the second communication terminals perform communication using the superimposed signal.

In this communication system, it is preferred that wherein the transmission signal is a voltage signal constituted by the plurality of periods that are divided by switching the voltage, and wherein the signal adjustment section is configured to eliminate the voltage difference between sequential superimposing periods when the second communication terminals perform communication using the superimposed signal.

In this communication system, it is preferred that wherein the second communication terminals periodically perform communication using the superimposed signal, and wherein the signal adjustment section is configured to extend the superimposing period by an extension length for every extension cycle number of times, the extension length and the number of the extension cycle being determined in accordance with timing that the second communication terminals perform communication using the superimposed signal.

In this communication system, it is preferred that wherein the superimposing period is superimposable period which is a partial period of the transmission signal and in which the superimposed signal is allowed to be superimposed, and the remaining period of the transmission signal is unsuperimposing period in which the superimposed signal is not allowed to be superimposed, and wherein the permissible range set by the transmission unit is a range by which the first communication terminal can perform communication through the transmission signal when the length of the frame is set within the range.

The transmission unit of the present invention is adapted to be used in a communication system in which first communication terminals perform communication through a transmission signal that is repeatedly transmitted to a transmission path and second communication terminals perform communication through a superimposing signal superimposed on the transmission signal, wherein the transmission signal is a signal in conformity with a time-division system, each frame in the signal being divided into a plurality of periods in a time axis direction, the plurality of periods including superimposing period adapted for superimposing therein the superimposed signal, and wherein the transmission unit includes: a signal transmitting section configured to transmit the transmission signal to the transmission path; and a signal adjustment section configured to adjust, within a permissible range that is set with respect to the transmission signal, a proportion of the superimposing period in one frame of the transmission signal in accordance with a transmission state of the superimposed signal, and wherein the transmission unit transmits, from the signal transmitting section to the transmission path, the transmission signal of which the proportion of the superimposing period is adjusted by the signal adjustment section.

In this transmission unit, it is preferred that wherein the superimposing period is superimposable period which is a partial period of the transmission signal and in which the superimposed signal is allowed to be superimposed, and the remaining period of the transmission signal is unsuperimposing period in which the superimposed signal is not allowed to be superimposed, and wherein the permissible range is a range by which the first communication terminal can perform communication through the transmission signal when the length of the frame is set within the range.

With the present invention, the proportion of the superimposing period in one frame of the transmission signal is adjusted by the signal adjustment section in accordance with the transmission state of the superimposed signal, as long as not exceed the permissible range for enabling the communication of the first communication terminal through the transmission signal (i.e. within the permissible range set by the transmission unit). Accordingly, in the present invention, the communication speed of the communication performed through the superimposed signal can be improved.

BRIEF DESCRIPTION OF DRAWINGS

FIG. 1, composed of FIGS. 1A and 1B, shows a configuration of first embodiment.

DETAILED DESCRIPTION OF INVENTION

First Embodiment

Figure 1A:
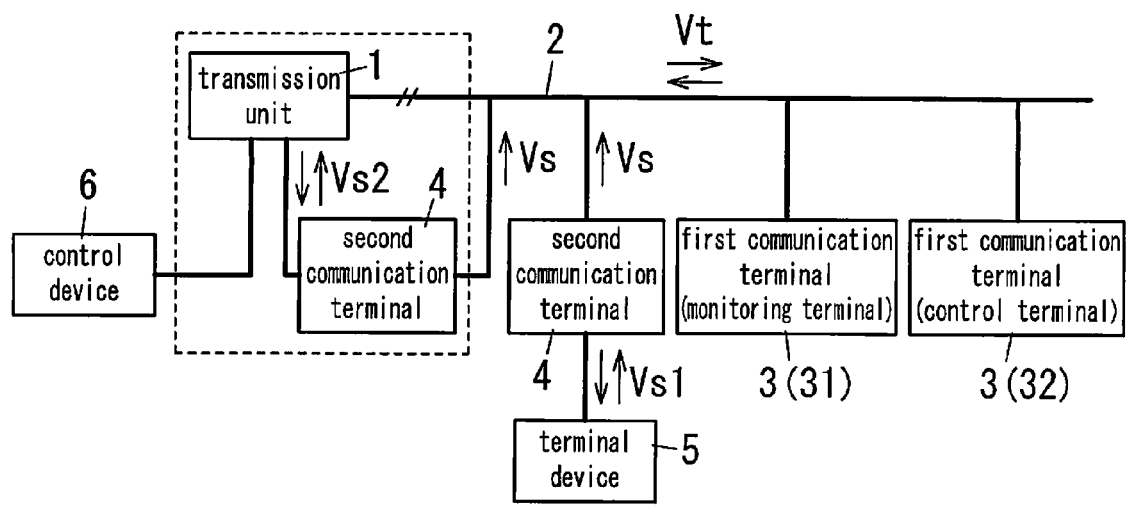
FIG. 1A is a schematic system configuration diagram of a communication system.

As shown in FIG. 1A, a communication system of the embodiment is a communication system including a transmission unit 1 which is connected to a two-wire type transmission path 2.

This communication system includes a plurality of first communication terminals 3 which are connected to the transmission path 2 and configured to communicate with the transmission unit 1; and a plurality of second communication terminals 4 which are connected to the transmission path 2 and configured to directly communicate with each other. FIG. 1A shows an example where two first communication terminals 3 and two second communication terminals 4 are connected to the transmission path 2, but more of the first communication terminals 3 and/or the second communication terminals 4 can be connected to the transmission path 2.

In this communication system, communication is performed through a transmission signal (signal according to first protocol; first protocol signal) Vt which is transmitted in the transmission path 2, and through a superimposed signal (signal according to second protocol; second protocol signal) Vs which is superimposed on the transmission signal Vt. The superimposed signal Vs has a higher frequency than the transmission signal Vt. An impedance matching module (not shown) which gives high impedance to the superimposed signal Vs is provided at each connection point of the transmission unit 1 and the first communication terminals 3 with respect to the transmission path 2.

The plurality of first communication terminals 3 are connected in parallel to the transmission unit 1 via the transmission path 2. The transmission unit 1 and the first communication terminals 3 create a time-division multiplexing communication system (hereinafter referred to as "base system") in which data transmission from the transmission unit 1 to the first communication terminal 3 and data transmission from the first communication terminal 3 to the transmission unit 1 are performed in a time-division manner.

In the base system, the first communication terminal 3 is categorized into two types: a monitoring terminal 31 attached to a switch, a sensor, or the like (not shown); and a control terminal 32 attached to a load (not shown). Thus, it is possible to control a load attached to a control terminals 32 in response to a monitoring input from a switch, a sensor or the like attached to a monitoring terminals 31. FIG. 1A shows an example where a single monitoring terminal 31 is connected to the transmission path 2, but more of the monitoring terminals 31 can be connected to the transmission path 2. FIG. 1A shows an example where a single control terminal 32 is connected to the transmission path 2, but more of the control terminals 32 can be connected to the transmission path 2. Note that, each of the first communication terminals 3 stores a preliminarily assigned own address in a memory (not shown) thereof.

When receiving a monitoring input (e.g. detection signal of turning on/off of a switch), a monitoring terminal 31 transmits, to the transmission unit 1, control information corresponding to the received monitoring input. When receiving the control information, the transmission unit 1 transmits the control information to a control terminal 32 which is associated with this monitoring terminal 31 by the address. When receiving the control information, the control terminal 32 controls a load in accordance with the control information. As described above, the control information reflects the monitoring input that has been inputted from the switch or the like. Therefore, the monitoring input from the switch or the like is reflected on the control of the load.

Subsequently, an operation of the base system will be described.

Figure 2A:
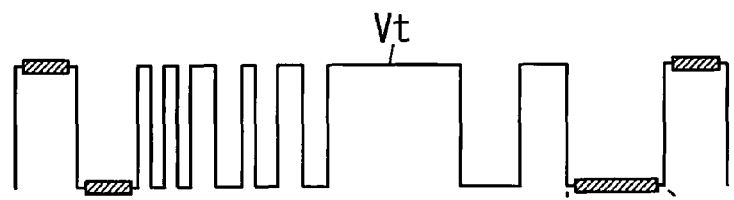
FIG. 2, composed of FIGS. 2A and 2B, illustrates an operation of a signal adjustment section of the first embodiment.

The transmission unit 1 transmits, to the transmission path 2, the transmission signal Vt in conformity with a time-division system having a voltage waveform which is divided into a plurality of periods in a time axis direction, as shown in FIG. 2A. The transmission signal Vt is a time-division multiplexing signal which is constituted by a preliminary interrupt period 31, a preliminary period 32, a transmission period 33, a return period 34, an interrupt period 35, a short-circuit detection period 36, and an rest period 37, and is a bipolar signal (±24 [V]). The preliminary interrupt period 31 serves as a period for detecting a secondary interrupt (e.g. an interrupt performed by the first communication terminal 3 other than an interrupt polling). The preliminary period 32 is a period that is set in accordance with the interrupt period 35 and the short-circuit detection period 36. The transmission period 33 serves as a period for transmitting data to a first communication terminal 3. The return period 34 serves as a time slot for receiving a return signal sent from a first communication terminal 3. The interrupt period 35 serves as a period for detecting an interrupt signal. The short-circuit detection period 36 serves as a period for detecting short circuit. The rest period 37 is a period designed for a case where processing is not carried out in time. The transmission signal Vt is a signal for transmitting data with modulating the pulse width of a carrier constituted by a pulse train.

Figure 4A:
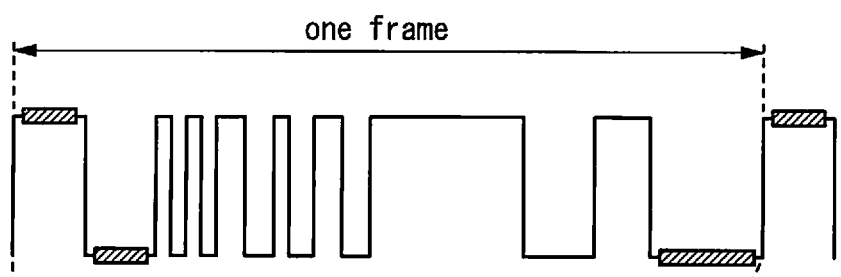
FIG. 4, composed of FIGS. 4A and 4B, illustrates a yet another operation of the signal adjustment section of the first embodiment.

The transmission unit 1 repeatedly transmits, to the transmission path 2, a transmission signal Vt having a signal waveform shown in FIG. 2A. Each one frame of the transmission signal Vt is divided into the abovementioned periods 31 to 37 in the time axis direction. Although these periods 31 to 37 are divided and named according to their roles, they actually are a consecutive period. One cycle in repetition of the transmission signal Vt is referred to as the "One frame" (see FIG. 4). In the embodiment, the "one frame" is defined as a period from the preliminary interrupt period 31 to the rest period 37.

As to each first communication terminal 3, when detecting that address data of a transmission signal Vt included in a transmission period 33 transmitted via the transmission path 2 matches to the address stored in the memory (not shown), the first communication terminal 3 retrieves control information for controlling a load from the transmission signal Vt. Further, the first communication terminal 3 returns control information, as a current mode signal (signal which is transmitted by shunting the transmission path 2 by a proper low impedance element), in synchronization with a return period 34 of a transmission signal Vt. Note that, power of internal circuits in each first communication terminal 3 is supplied by rectifying and stabilizing the transmission signal Vt transmitted via the transmission path 2.

The transmission unit 1 normally performs a regular polling in which the transmission unit 1 sequentially access to the first communication terminals 3 with cyclically altering the address data included in the transmission signal Vt. In the regular polling, a first communication terminal 3 having an address that matches with the address data included in the transmission signal Vt acquires control information from the transmission signal Vt and then operates if the control information is included, and returns its own operating condition to the transmission unit 1.

When receiving an interrupt signal, which is generated by a monitoring terminal 31 (first communication terminal 3) in response to a monitoring input sent by a switch or the like, the transmission unit 1 searches for the first communication terminal 3 which has generated the interrupt signal, and accesses to the first communication terminal 3 to perform an interrupt polling.

That is, the transmission unit 1 normally transmits a transmission signal Vt having mode data of a normal mode. When detecting an interrupt signal generated by a monitoring terminal 31 (first communication terminal 3) in synchronization with an interrupt period 35 of a transmission signal Vt, the transmission unit 1 transmits a transmission signal Vt having mode data of an interrupt polling mode.

When detecting that high-order bit of address data of a transmission signal Vt of the interrupt polling mode matches high-order bit of its own address, the first communication terminal 3 (monitoring terminal 31) that has generated the interrupt signal returns low-order bit of its own address as return data in synchronization with a return period 34 of the transmission signal Vt. Thus, the transmission unit 1 can obtain the address of the first communication terminal 3 that has generated the interrupt signal.

When obtaining the address of the first communication terminal 3 (monitoring terminal 31) that has generated the interrupt signal, the transmission unit 1 transmits a transmission signal Vt for requesting a return of control information to the first communication terminal 3. Then, the first communication terminal 3 returns the control information corresponding to the monitoring input from the switch or the like, to the transmission unit 1. When receiving the control information, the transmission unit 1 transmits, to this first communication terminal 3, an instruction to clear the monitoring input. The first communication terminal 3 then clears the monitoring input.

When receiving the control information, the transmission unit 1 generates control information to be transmitted to a first communication terminal 3 (a control terminal 32) which is associated, by a relation of address, with the first communication terminal 3 (the monitoring terminal 32) of an origin of the control information. Then, the transmission unit 1 transmits a transmission signal Vt including this control information to the transmission path 2, thereby controlling a load attached to the first communication terminal 3 (control terminal 32).

As described above, in the base system, the first communication terminals 3 (the monitoring terminal 31, the control terminal 32) communicate with each other via the transmission unit 1 according to a polling-selecting system protocol (first protocol).

In the communication system of the embodiment, the plurality of second communication terminals 4 share the transmission path 2 with the above-mentioned base system. Then, the plurality of second communication terminals 4 communicate with each other using a superimposed signal Vs which is superimposed on a transmission signal Vt of the first protocol.

A terminal devices 5 is connected to a part of the second communication terminals 4, and a master unit is connected to other of the second communication terminals 4. Here, the terminal device 5 is configured to output monitoring information to be transmitted between the second communication terminals 4, and the master unit is configured to obtain the monitoring information from the second communication terminal 4. In the example shown in FIG. 1, the transmission unit 1 is integrally connected to a master unit. The transmission unit 1 is provided with a first terminal 13 for connecting to the transmission path 2, and a second terminal 14 for connecting to a second communication terminal 4. The transmission unit 1 is further provided with a third terminal 15 for connecting to a control device 6 which is configured to control a master unit. Each of the terminal devices 5 and the master unit periodically communicates to transmit/receive data with the corresponding second communication terminal 4.

In the embodiment, the transmitting data (monitoring information) is generated by the terminal device 5 (or may be master unit) and the received data is processed by the master unit (or may be terminal device 5), although communication (transmission of data) via the transmission path 2 is performed between the second communication terminals 4. That is, the second communication terminal 4 functions as an adaptor for communication which converts data sent from a connected terminal device 5 or a master unit and transmits the data to the transmission path 2. In the embodiment, a terminal device 5 transmits a third protocol signal (signal according to third protocol) Vs1 to a second communication terminal 4. When receiving the signal Vs1 from the terminal device 5, the second communication terminal 4 converts the signal Vs1 into a superimposed signal (second protocol signal) Vs and transmits to the transmission path 2. A second communication terminal 4 which is connected to the transmission unit 1 as master unit then receives the superimposed signal Vs, converts the received superimposed signal Vs into a fourth protocol signal (signal according to fourth protocol) Vs2, and transmits to the transmission unit 1 as master unit. The second, third and fourth protocols may be identical to one another. In the embodiment, communication between the transmission unit 1 as master unit and the terminal device 5 is performed using the second protocol signal Vs. Therefore, communication between the terminal device 5 and the second communication terminal 4 is performed through the second protocol signal Vs, and communication between the transmission unit 1 as master unit and the second communication terminal 4 is performed through the second protocol signal Vs. In the embodiment, communication between the second communication terminals 4 is performed through a signal in which a superimposed signal Vs is superimposed on a transmission signal Vt (i.e. through a superimposed signal Vs that is superimposed on a transmission signal Vt). The terminal device 5 may be a power measuring device for measuring power consumption of a lighting device that is controlled by the base system, and the master unit may be an inspection meter for displaying the power consumption measured by the power measuring device. FIG. 1A shows an example where a single terminal device 5 is connected to the transmission path 2 (via the second communication terminal 4), but more of the terminal devices 5 can be connected to the transmission path 2. FIG. 1A shows an example where a single master unit is connected to the transmission path 2 (via the second communication terminal 4), but more of the master units can be connected to the transmission path 2. Note that, the transmission path 2 is allowed to connect only one transmission unit 1 (device which transmits the transmission signal Vt).

A second communication terminal 4 directly transmits transmission data (monitoring information) to another second communication terminal 4 in peer-to-peer fashion without passing through the transmission unit 1 according to the protocol (second protocol) which is different from the first protocol. In detail, the second communication terminal 4 is configured to transmit, to the transmission path 2, a packet which includes data to be transmitted to another second communication terminal 4 according to the second protocol, and configured to receive a packet transmitted by another second communication terminal 4. The packet according to the second protocol is superimposed on the transmission signal Vt transmitted from the transmission unit 1. Namely, the first communication terminals 3 perform communication with each other according to the first protocol via the transmission unit 1, and meanwhile the second communication terminals 4 directly perform communication with each other according to the second protocol without passing through the transmission unit 1. Therefore, the communication according to the second protocol (second protocol communication) can have a higher communication speed than that of the communication according to the first protocol (first protocol communication), and thus the second protocol communication is useful for a transmission of information with a relatively large data volume such as an analog quantity (e.g. measured data of electric energy).

Further, the second communication terminal 4 is configured to monitor the transmission signal Vt (first protocol signal) transmitted between the transmission unit 1 and the first communication terminals 3 in the base system, and to analyze a data transmission state of the first protocol (hereinafter referred to as "state") from the transmission signal Vt. Further, the second communication terminal 4 has a function of judging whether or not the state is suitable for transmitting a second protocol packet, and transmitting the packet at a time when it is judged to be suitable for transmission.

As described above, the transmission signal Vt has the signal format as shown in FIG. 2A. The preliminary interrupt period 31, the preliminary period 32 and the rest period 37 are regarded as a period within which the superimposed signal Vs is allowed to be superimposed (which is referred to as "superimposable period" hereafter), because the first protocol communication is not affected even if the superimposed signal Vs is superimposed, and the superimposed signal Vs is insusceptible to the transmission signal Vt. In the embodiment, the superimposable period is used as superimposing period for superimposing the superimposed signal Vs.

Other periods (the transmission period 33, the return period 34, the interrupt period 35 and the short-circuit detection period 36) each include relatively short time during which the transmission signal Vt is stable at a high level or low level. Therefore, the first protocol communication is susceptible to the superimposed signal Vs if the superimposed signal Vs is superimposed within these periods. Also, the superimposed signal Vs is easily affected by a signal (e.g. interrupt signal or return data) transmitted and received between the transmission unit 1 and the first communication terminal 3 if the superimposed signal Vs is superimposed within these periods (33, 34, 35, 36). Therefore, these periods (i.e. above mentioned the other periods) are regarded as a period within which the superimposed signal is not superimposed (hereinafter, referred to as "unsuperimposing period").

Further, rising and falling periods in the transmission signal Vt also are not suitable for superimposing the superimposed signal Vs, because of influences of harmonic noise, transient response due to voltage inversion of a signal, or the like. Thus, a predetermined time (e.g., 300 [μs]) after switching (rising and falling) of the period is regarded as unsuperimposing period even in the preliminary interrupt period 31, the preliminary period 32 and the rest period 37 of the transmission signal Vt. Namely, the transmission signal is divided into the plurality of periods in the time axis direction such that the plurality of periods includes superimposing period (superimposable period), and the remaining part of the transmission signal is unsuperimposing period.

In the embodiment, the second communication terminal 4 is configured to analyze the state of a transmission signal Vt, to judge whether the current period is the superimposable period or the unsuperimposing period based on the analysis result (state of the transmission signal Vt), and to transmit a superimposed signal Vs only when it is so judged that the current period is the superimposable period. For example, the second communication terminal 4 may be configured to decide a start point of a return period 34 by that: when the second communication terminal 4 detects that the voltage level of a transmission signal Vt does not change for a predetermined time after encountering a pulse having a pulse width that is shorter than the predetermined time. In an example, the transmission signal Vt represents a bit "0" by a pulse with a pulse width of 125 [μs], and represents a bit "1" by a pulse with a pulse width of 250 [μs]. In this case, when a second communication terminal 4 detects a condition that voltage level of a transmission signal Vt does not change for a predetermined time (e.g. 350 [μs] which is larger than the above pulse widths) after encountering a certain number (e.g. 28) of pulses whose pulse width are shorter than the predetermined time (e.g. 350 [μs]), the second communication terminal 4 decides that a return period 34 has begun at the initial point of a time period during which the voltage level is kept. The second communication terminal 4 can analyze the "state" by such the way. And then, the second communication terminal 4 transmits a superimposed signal Vs only when the current period is judged to be the superimposable period. The second communication terminals 4 superimposes a superimposed signal Vs only within the superimposable period of a transmission signal Vt in synchronization with the transmission signal Vt, thereby avoiding interference between the first protocol communication and the second protocol communication regardless of sharing the transmission path 2.

If the second communication terminal 4 can not transmit transmission data within a single superimposable period due to large data volume, the second communication terminal 4 temporary terminates the communication at the end of the current superimposable period, and transmits the remained data in the next superimposable period.

Note that, power can be supplied to each section of the second communication terminal 4 by a system (centralized power supply system) which the power is supplied by rectifying and stabilizing the transmission signal Vt transmitted via the transmission path 2 from the transmission unit 1, as similar to the first communication terminal 3 in the base system. However, the power supply system is not limited to this configuration. The power can be supplied to each section of the second communication terminal 4 by a system (local power supply system) which the power is supplied by rectifying and stabilizing a commercial power.

Figure 1B:
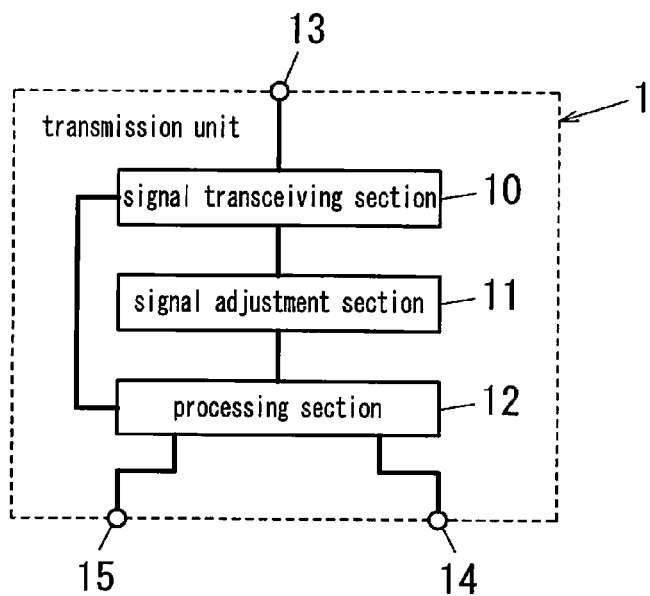
FIG. 1B is a schematic block diagram of a transmission unit.

In the embodiment, the transmission unit 1 includes: a signal transceiving section (signal transmitting/receiving section) 10 configured to transmit the transmission signal Vt to the transmission path 2; a signal adjustment section 11 configured to adjust a proportion of the superimposable period in one frame of the transmission signal Vt; and a processing section 12 configured to perform various processes, as shown in FIG. 1B.

The signal transceiving section 10 is connected to the first terminal 13. The signal transceiving section 10 repeatedly transmits the transmission signal Vt to the transmission path 2 via the first terminal 13, thereby enabling to perform the first protocol communication between the first communication terminals 3 and supplying electric power to the first communication terminals 3 by the transmission signal Vt. The signal transceiving section 10 receives a return signal transmitted during a return period 34 of a transmission signal Vt from a first communication terminal 3. The signal transceiving section 10 is connected to the processing section 12. The signal transceiving section 10 communicates with the processing section 12, and receives therefrom the data which is to be transmitted to a first communication terminal 3 during a transmission period 33 and transmits thereto the data which is transmitted from a first communication terminal 3 during a return period 34.

The processing section 12 performs various processes using the data transceived with the signal transceiving section 10. The processing section 12 is connected to the second terminal 14 and the third terminal 15, and has a function as the master unit for gathering data (monitoring information) from terminal devices 5 through the communication performed between the second communication terminals 4.

The signal adjustment section 11 is connected to the processing section 12 and the signal transceiving section 10. The signal adjustment section 11 adjusts the proportion of the superimposable period in one frame of the transmission signal in accordance with an input inputted to the transmission unit 1 as the master unit from the second communication terminal 4. In the embodiment, the signal adjustment section 11 regards the transmission state of the superimposed signal Vs (which is transmitted and received between the second communication terminals 4) as the input inputted from the second communication terminal 4, and adjusts the proportion of the superimposable period in accordance with the transmission state. In detail, the signal adjustment section 11 obtains, from the processing section 12, data volume of transmission data to be transmitted between the second communication terminals 4. And then, the signal adjustment section 11 adjusts the proportion of the superimposable period in one frame of the transmission signal Vt so that the proportion of the superimposable period increases with the increase of the data volume.

In the embodiment, length of the (one) frame of the transmission signal Vt is not fixed to a certain value, and the length of the frame is changeable within a certain range. That is, the first protocol communication is not affected and the first communication terminals 3 can communicate with each other through the transmission signal Vt, even the length of the frame of the transmission signal Vt is changed within a permissible range.

In the embodiment, the signal adjustment section 11 adjusts the proportion of the superimposable period in one frame of the transmission signal Vt by means of changing the length of the superimposable period in accordance with the volume of data to be transmitted between the second communication terminals 4, without changing the length of the unsuperimposing period. In the embodiment, the signal adjustment section 11 adjusts the length of the superimposable period by adjusting the length of the rest period 37 (see FIGS. 2A, 2B). The signal adjustment section 11 may be configured to adjust at least one of superimposable periods selected from the preliminary interrupt period 31, the preliminary period 32 and the rest period 37 in order to adjust the length of the superimposable period. Note that the signal adjustment section 11 adjusts the length of the superimposable period (rest period 37 in the embodiment) within a range confined by a predetermined upper limit and a predetermined lower limit so that the length of the (one) frame of the transmission signal Vt after adjustment falls within a permissible range (the permissible range set by the transmission unit 1 with regard to the transmission signal Vt) by which the first protocol communication is not affected as long as the length of the (one) frame is set within the range.

Figure 2B:
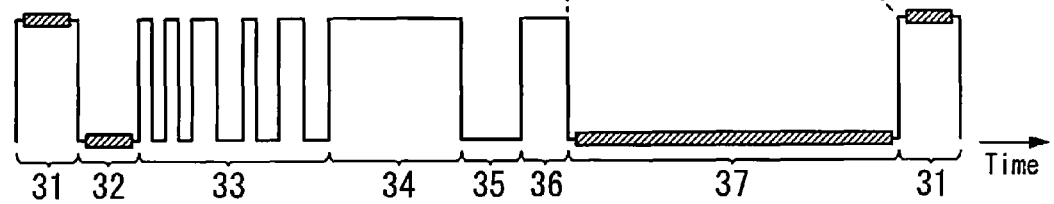

In a case where volume of data to be transmitted between the second communication terminals 4 is smaller than a predetermined threshold, the signal adjustment section 11 sets the length of the rest period 37 (as the superimposable period) to the lower limit, as shown in FIG. 2A. In a case where volume of data to be transmitted between the second communication terminals 4 is larger than the threshold, the signal adjustment section 11 extends the length of the rest period 37 (as the superimposable period) as long as not exceed the upper limit, as shown in FIG. 2B. In the latter case, the total length of the (one) frame of the transmission signal Vt becomes long. The signal adjustment section 11 decides the extending length of the superimposable period in accordance with the data volume of transmission data to be transmitted between the second communication terminals 4.

In one embodiment of the communication system, the transmission unit 1 is integrated with a master unit, and transmits data using the superimposed signal (second protocol signal) Vs via the second communication terminal 4. Thus, the transmission unit 1 decides the proportion (i.e. extending length) of the superimposable period in accordance with the volume of the data which is to be transmitted from itself.

In one embodiment of the communication system, the second communication terminals 4 communicate to transmit data periodically with each other. The communication system has a setting mode and an implementation mode. In the setting mode, the transmission unit 1 acquires estimated data volume of data which will be transmitted between the second communication terminals 4 during the implementation mode. For example, in the setting mode, the transmission unit 1 acquires the estimated data volume in view of that the volume of data transmitted from the second communication terminal 4 and that whether or not the data can be transmitted from the second communication terminal 4 within a single superimposable period. And then, the signal adjustment section 11 of the transmission unit 1 decides the proportion (extending length) of the superimposable period based on the estimated data volume obtained during the setting mode. In the implementation mode, the signal adjustment section 11 adjusts the superimposable period based on the decided proportion of the superimposable period. For example, the setting mode may be executed at the time the communication system is constructed. The setting mode may be executed every predetermined time (e.g. every month).

In a case where the terminal device 5 periodically transmits, to the master unit, data through the superimposed signal (second protocol signal), (e.g. in a case where a power measuring device as the terminal device 5 periodically transmits, to an inspection meter as the master unit, a power consumption as the data,) volume of the data transmitted from the terminal device 5 will be substantially same every time. In this case thus, the transmission unit 1 can decide the proportion (extending length) of the superimposable period, based on the volume of data transmitted between the second communication terminals 4 when the communication system is set to the setting mode.

In one embodiment of the communication system, the second communication terminals 4 communicate to transmit data periodically with each other. The communication system has a setting mode and an implementation mode. In the setting mode, the transmission unit 1 acquires estimated data volume of data to be transmitted between the second communication terminals 4 during the implementation mode. For example, in the setting mode, the second communication terminal 4 (that is connected to the terminal device 5) transmits the estimated data volume to the transmission unit 1. And then, the signal adjustment section 11 of the transmission unit 1 decides the proportion (extending length) of the superimposable period based on the estimated data volume obtained during the setting mode. In the implementation mode, the signal adjustment section 11 adjusts the superimposable period based on the decided proportion of the superimposable period.

The transmission unit 1 transmits, to the transmission path 2 from the signal transceiving section 10 as a signal transmitting section, the transmission signal Vt of which the proportion of the superimposable period is adjusted by the signal adjustment section 11.

In the communication system of the embodiment described above, the signal adjustment section 11 adjusts the proportion of the superimposable period in one frame of the transmission signal Vt in accordance with the transmission state of the superimposed signal Vs transmitted between the second communication terminals 4. This configuration therefore enables to improve the communication speed of the communication through the superimposed signal Vs. In the embodiment, the signal adjustment section 11 increases the proportion of the superimposable period in one frame of the transmission signal Vt so that the proportion increases with the increase of the data volume transmitted through the superimposed signal Vs. This configuration thus can increase opportunity of superimposing a superimposed signal Vs on a transmission signal Vt. Accordingly, this configuration can increase the data volume to be transmitted through the superimposed signal Vs in one frame of the transmission signal Vt, improve the efficiency of the second protocol communication performed through the superimposed signal Vs, and improve the communication speed of the second protocol communication.

In the embodiment, the signal adjustment section 11 extends the rest period 37 in accordance with the volume of data transmitted between the second communication terminals 4. However, the embodiment is not limited to this configuration, as long as adjusts the proportion of the superimposable period in accordance with the transmission state of the superimposed signal Vs. Some of modified examples of the embodiment are described below.

In a first example, the signal adjustment section 11 is configured to extend the respective lengths of the preliminarily period 31, the preliminary period 32 and the rest period 37 into maximums (extend the superimposable period into maximum) when a second communication terminal 4 performs communication using the superimposed signal Vs. Note that the signal adjustment section 11 extends the superimposable period into maximum within a range so as not to exceed a predetermined upper limit so that the length of the (one) frame of the transmission signal Vt falls within a permissible range (the permissible range set by the transmission unit 1) by which the first protocol communication is not affected.

Figure 3A:
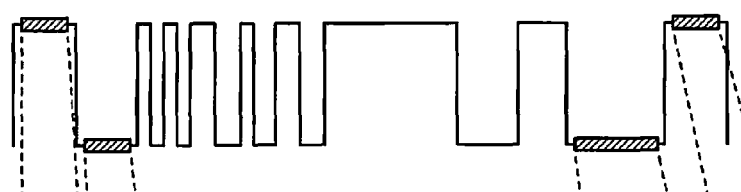
FIG. 3, composed of FIGS. 3A and 3B, illustrates another operation of the signal adjustment section of the first embodiment.
Figure 3B:
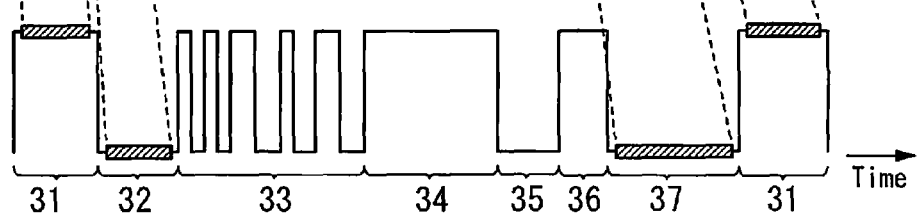

In this example, superimposable period of a transmission signal Vt (which has the signal shape shown in FIG. 3A under normal time) is extended by the signal adjustment section 11 as shown in FIG. 3B only when a second communication terminal 4 performs communication through the superimposed signal Vs, and thus the proportion of the superimposable period in one frame increases. This configuration can increase the volume of data which is transmitted within one frame of the transmission signal Vt though the superimposed signal Vs, while suppressing the influence on the first protocol communication performed through the transmission signal Vt, and therefore can improve the communication speed of the second protocol communication performed through the superimposed signal Vs.

In a second example, the signal adjustment section 11 is configured to shorten the respective lengths of the transmission period 33, the return period 34, the interrupt period 35 and the short-circuit detection period 36 into minimums (shorten the unsuperimposing period into minimum) when a second communication terminal 4 performs communication using the superimposed signal Vs. Note that the signal adjustment section 11 shortens the unsuperimposing period into minimum within a range so as not to be less than a predetermined lower limit so that the length of the (one) frame of the transmission signal Vt falls within a permissible range (the permissible range set by the transmission unit 1) by which the first protocol communication is not affected.

Figure 4B:
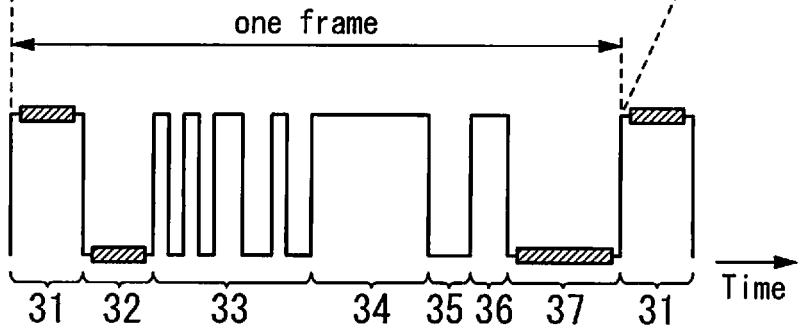

In this example, unsuperimposing period of a transmission signal Vt (which has the signal shape shown in FIG. 4A under normal time) is shortened by the signal adjustment section 11 as shown in FIG. 4B only when a second communication terminal 4 performs communication through the superimposed signal Vs, and thus the proportion of the superimposable period in one frame increases. This configuration can improve the efficiency of the second protocol communication performed through the superimposed signal Vs, and can improve the communication speed of the second protocol communication. With this configuration, the length of one frame of the transmission signal Vt is shortened although the length of the superimposable period in one frame of the transmission signal Vt is not changed. Accordingly, this configuration can transmit data with a shortened time in a case where certain volume of transmission data is divided and transmitted over a plurality of frames of the transmission signal Vt.

The signal adjustment section 11 may simultaneously perform both of a function for extending the superimposable period as described in the first example and a function for shortening the unsuperimposing period as described in the second example. This configuration enables to increase significantly the proportion of the superimposable period in one frame of the transmission signal Vt.

In a third example, the signal adjustment section 11 is configured to eliminate the shift (difference) of the voltage between sequential superimposable periods when a second communication terminal 4 performs communication through the superimposed signal Vs, thereby increasing the proportion of the superimposable period in one frame. As described above, in the transmission signal Vt, a predetermined time (e.g., 300 [μs]) after switching of the periods are regarded as unsuperimposing periods even in the preliminary interrupt period 31, the preliminary period 32 and the rest period 37. Therefore, the proportion of the superimposable period can be increased by eliminating the voltage shift between the periods.

Figure 5A:
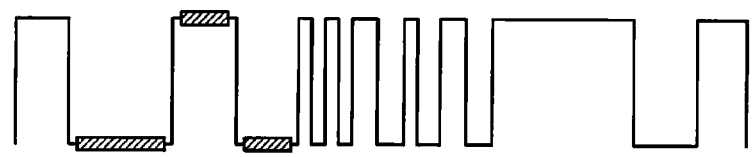
FIG. 5, composed of FIGS. 5A and 5B, illustrates a yet another operation of the signal adjustment section of the first embodiment.
Figure 5B:
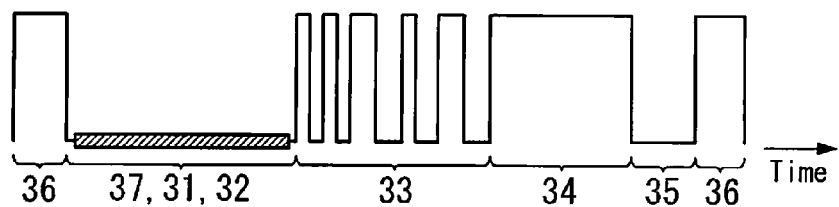

The rest period 37, the preliminary interrupt period 31 and the preliminary period 32 sequentially appear in the time axis direction as shown in FIG. 5A, and the voltages are switched (shifted) at transitions of these periods in normal time. Therefore, the predetermined time after starting each period is regarded as unsuperimposing period in normal time. Incidentally, the rest period 37 is not used for the communication through the first communication terminals 3. In addition, the preliminary interrupt period 31 and the preliminary period 32 are not used for the communication through the first communication terminals 3 unless the first communication terminal 3 performs a secondary interrupt. In this example, the signal adjustment section 11 eliminates the voltage shift between the rest period 37, the preliminary interrupt period 31 and the preliminary terminal 32 as shown in FIG. 5B only when a second communication terminal 4 performs communication through the superimposed signal Vs. This configuration therefore can increase the proportion of the superimposable period without affecting the first protocol communication.

In a fourth example, the signal adjustment section 11 is configured to extend the superimposable period by a predetermined extension length for every extension cycle number of times when a second communication terminal 4 performs communication using the superimposed signal Vs. Note that the extension length and the number of the extension cycle each are determined within a range so as not to exceed a predetermined upper limit so that the length of the frame of the transmission signal Vt falls within a permissible range (within the permissible range set by the transmission unit 1) by which the first protocol communication is not affected, in accordance with a timing when the second communication terminal 4 performs communication through the superimposed signal Vs.

Figure 6A:
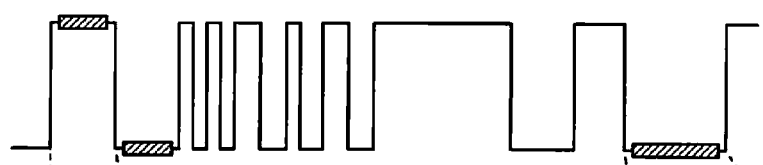
FIG. 6, composed of FIGS. 6A and 6B, illustrates a yet another operation of the signal adjustment section of the first embodiment.
Figure 6B:
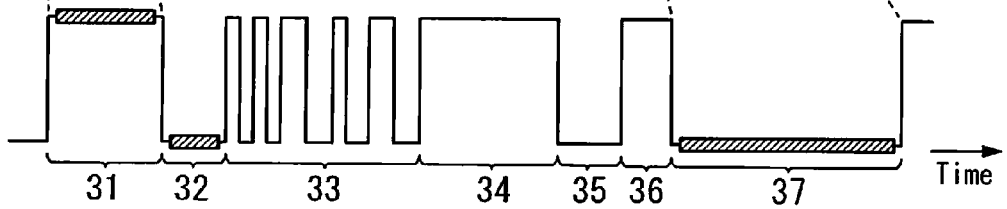

In this example, the superimposable period of the transmission signal Vt (which has the signal shape shown in FIG. 6A under normal time) is extended by the signal adjustment section 11 as shown in FIG. 6B in synchronization with timing when the second communication terminal 4 performs communication through the superimposed signal Vs, and thus the proportion of the superimposable period in one frame increases. In this example, the preliminary interrupt period 31 and the rest period 37 are extended every three frames (every three cycles) of the transmission signal Vt.

The communication system of this example may have a setting mode and an implementation mode. The signal adjustment section 11 may decide the number of the extension cycle, the extension length and the timing of extension of the superimposable period based on the data that is transmitted between the second communication terminals 4 during the setting mode.

This example can extend the superimposable period so as to increase the volume of data which is transmitted within one frame of the transmission signal Vt through the superimposed signal Vs without affected by feature of the transmission signal Vt, and therefore can improve the communication speed of the second protocol communication performed through the superimposed signal Vs. Incidentally, a considerable extension of the superimposable period of the transmission signal Vt may cause the first protocol communication performed through the transmission signal Vt to deteriorate the responsiveness. In contrast to this, in the fourth example, the superimposable period is extended in synchronization with the second protocol communication performed through the superimposed signal Vs. Accordingly, this configuration can suppress unnecessary extension of the superimposable period, and can suppress the influence on the first protocol communication.

Second Embodiment

A communication system of the embodiment differs from the communication system of the first embodiment in that the transmission unit 1 includes a signal stop section (not shown) configured to make the signal transceiving section 10 stop the transmission of the transmission signal Vt.

Figure 7A:
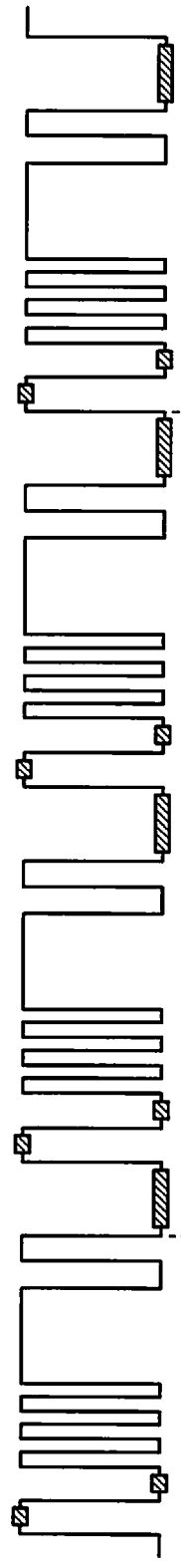
FIG. 7, composed of FIGS. 7A and 7B, illustrates an operation of a signal stop section of second embodiment.

The signal stop section stops the transmission of the transmission signal Vt over a predetermined stop period 38 as shown in FIG. 7. In the example shown in FIG. 7, the stop period 38 is set to a time length corresponding to about two frames of the transmission signal Vt. Timing at which the transmission signal Vt is stopped by the signal stop section is determined based on when a second communication terminal 4 performs communication through the superimposed signal Vs.

During the transmission of the transmission signal Vt, the superimposed signal Vs can be superimposed only within the superimposable period of the transmission signal Vt. In contrast to this, the superimposed signal Vs can be superimposed within whole of the stop period 38 because the transmission state (state) of the transmission signal Vt during the stop period 38 is same with that during the rest period 37. Accordingly, the second communication terminal 4 can perform communication through the superimposed signal Vs not only during the superimposable period of the transmission signal Vt but during the stop period 38 in which the transmission signal Vt is stopped.

With this configuration, transmission of the transmission signal Vt is stopped only when a second communication terminal 4 performs communication through the superimposed signal Vs. Accordingly, the second communication terminals 4 can perform the second protocol communication through the superimposed signal Vs without affected by the transmission signal Vt, and therefore the communication efficiency and the communication speed are improved.

The signal stop section is not limited to a configuration in which the transmission of the transmission signal Vt is completely stopped over the stop period 38 as shown in FIG. 7. For example, the signal stop section may be configured to stop the transmission of the transmission signal Vt over the stop period 38 other than the interrupt period 35 as shown in FIG. 8.

Figure 8A:
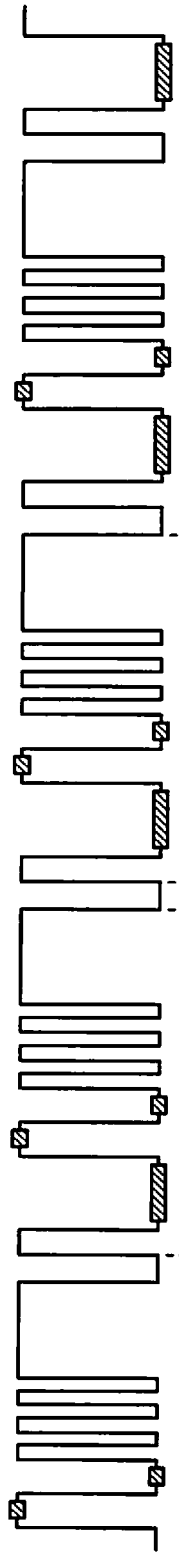
FIG. 8, composed of FIGS. 8A and 8B, illustrates another operation of the signal stop section of the second embodiment.
Figure 8B:
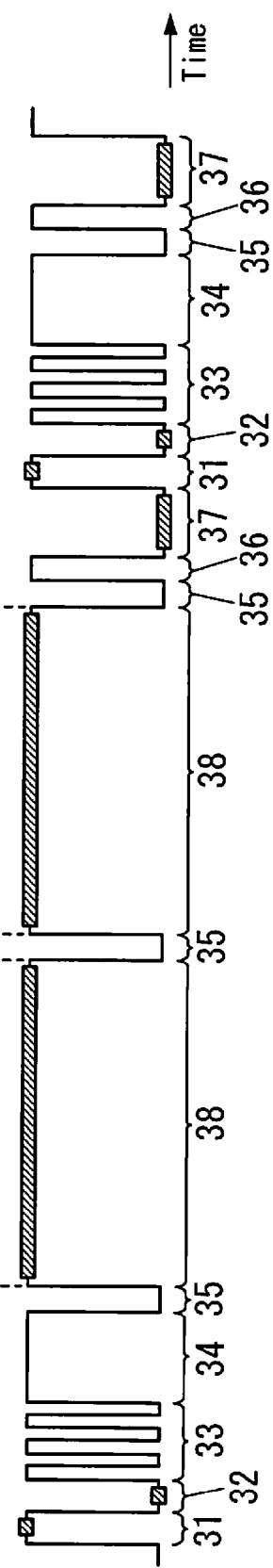

In the latter configuration, the interrupt period 35 interposed in the stop period 38 is the unsuperimposing period, and the second communication terminal 4 is not allowed to perform communication using the superimposed signal Vs during this period. When receiving an interrupt signal from a first communication terminal 3 during the interrupt period 35 interposed in the stop period 38, the transmission unit 1 restarts the transmission of the transmission signal Vt as shown in FIG. 8B. When not receiving an interrupt signal during the interrupt period 35, the transmission unit 1 continues to stop transmitting the transmission signal Vt until the end of the stop period 38. Because the transmission unit 1 can receive an interrupt signal from a first communication terminal 3 even in the stop period 38, this configuration can secure the responsiveness of the first protocol communication performed through the transmission signal Vt.

Figure 7B:
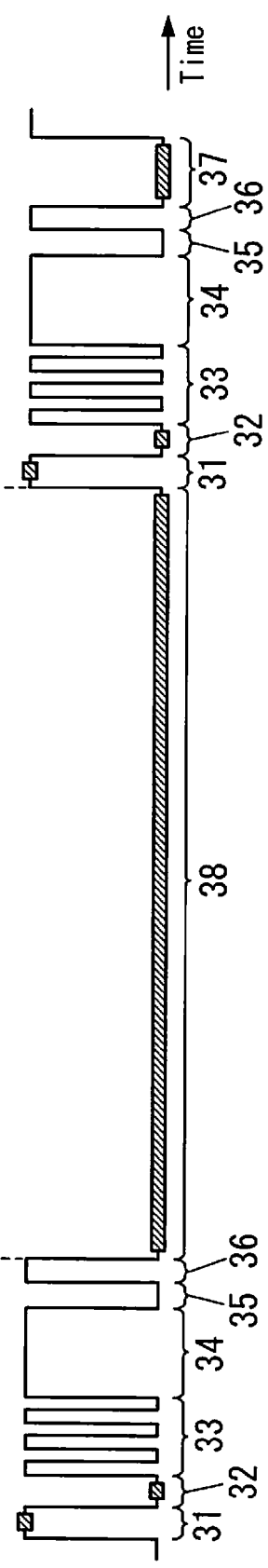

The signal stop section may be configured to be selectable between: a first operation mode in which the transmission of the transmission signal Vt is completely stopped over the stop period 38 as shown in FIG. 7B; and a second operation mode in which the transmission of the transmission signal Vt is stopped over the stop period 38 other than the interrupt period 35 as shown in FIG. 8B. In the second operation mode, the transmission unit 1 restarts the transmission of the transmission signal Vt upon receiving an interrupt signal from a first communication terminal 3 during the interrupt period 35 interposed in the stop period 38. In this configuration, it is desirable that the signal stop section automatically switches between the first operation mode and the second operation mode according to a priority level of the second protocol communication performed through the superimposed signal Vs.

That is, a priority level is provided to each of communications performed through the superimposed signal Vs by the second communication terminals 4 in accordance with the communication content so that a higher priority is given with respect to an important communication or a communication which is required to be transmitted soon. The signal stop section switches the operation modes based on the priority level. In detail, each of second protocol communications performed through the superimposed signal Vs is provided a priority level on a scale of 1 to 10. For example, if the priority level of the current second protocol communication is higher than "6", the signal stop section selects the first operation mode. If the priority level of the current second protocol communication is lower than or equal to "6", the signal stop section selects the second operation mode.

The signal stop section of the transmission unit 1 switches the operation modes based on the priority level of the second protocol communication, and therefore the transmission unit 1 can flexibly select the priority between the first protocol communication and the second protocol communication.

Other configuration and function of the embodiment is similar with those in the first embodiment.

The invention claimed is:

1. A communication system comprising:
a transmission circuit connected to a transmission path and configured to repeatedly transmit a transmission signal to the transmission path;
a first communication terminal connected to the transmission path and configured to perform communication using the transmission signal; and
a second communication terminal connected to the transmission path and configured to perform communication using a superimposed signal superimposed on the transmission signal,
wherein the transmission signal is a signal in conformity with a time-division system, each one frame in the signal being divided into a plurality of periods in a time axis direction, the plurality of periods including: a superimposing period which is a partial period of the transmission signal and in which the superimposed signal is superimposable; and an unsuperimposinq period which is a remaining period of the transmission signal and in which the superimposed signal is not superimposable, and
wherein the transmission circuit comprises a signal adjustment section configured to adjust, within a permissible range set by the transmission circuit, a length of the superimposing period in one frame of the transmission signal in accordance with a transmission state of the superimposed signal, and transmits, to the transmission path, the transmission signal of which the length of the superimposing period is adjusted by the signal adjustment section.

2. The communication system as set forth in claim 1, wherein the signal adjustment section is configured to extend, within the permissible range, the superimposing period into maximum when the second communication terminal performs communication using the superimposed signal.

3. The communication system as set forth in claim 1,
wherein the transmission signal is a voltage signal including the plurality of periods that are divided by a shift of the voltage, and
wherein the signal adjustment section is configured to eliminate the shift of the voltage between sequential superimposing periods to thereby extend the superimposing period when the second communication terminal performs communication using the superimposed signal.

4. The communication system as set forth in claim 1,
wherein the second communication terminal periodically performs communication using the superimposed signal, and
wherein the signal adjustment section is configured to extend the superimposing period by an extension length for every extension cycle number of times, the extension length and the number of the extension cycle being determined in accordance with timing that the second communication terminal performs communication using the superimposed signal.

5. The communication system as set forth in claim 1,
wherein the permissible range is a range for enabling the communication of the first communication terminal through the transmission signal.

6. A transmission circuit configured to be used in a communication system in which communication is performed between first communication terminals through a transmission signal that is transmitted repeatedly to a transmission path and in which communication is performed between second communication terminals through a superimposing signal that is superimposed on the transmission signal,
wherein the transmission signal is a signal in conformity with a time-division system, each one frame in the signal being divided into a plurality of periods in a time axis direction, the plurality of periods including: a superimposing period which is a partial period of the transmission signal and in which the superimposed signal is superimposable; and an unsuperimposing period which is a remaining period of the transmission signal and in which the superimposed signal is not superimposable,
wherein the transmission circuit comprises:
a signal transmitting section configured to transmit the transmission signal to the transmission path; and
a signal adjustment section configured to adjust, within a permissible range that is set for the transmission signal, a length of the superimposing period in one frame of the transmission signal in accordance with a transmission state of the superimposed signal, and
wherein the transmission circuit transmits, from the signal transmitting section to the transmission path, the transmission signal of which the length of the superimposing period is adjusted by the signal adjustment section.

7. The transmission circuit as set forth in claim 6,
wherein the permissible range is a range for enabling the communication of the first communication terminal through the transmission signal.

8. The communication system as set forth in claim 1,
wherein the first communication terminal is configured to transmit a return signal during a return period among the unsuperimposing period, and
wherein the second communication terminal is configured to superimpose the superimposing signal during the superimposing period.

* * * * *